(12) United States Patent
Leser et al.

(10) Patent No.: US 8,778,438 B2
(45) Date of Patent: Jul. 15, 2014

(54) AQUEOUS FOAMS, FOOD PRODUCTS AND A METHOD OF PRODUCING SAME

(75) Inventors: Martins Leser, Bretigny-s/Morrens (CH); Jean-Baptiste Bezelgues, Marysville, OH (US); Eric Kolodziejczyk, Vevey (CH); Martin Michel, Lausanne (CH)

(73) Assignee: Nestec S.A., Vevey (CH)

( * ) Notice: Subject to any disclaimer, the term of this patent is extended or adjusted under 35 U.S.C. 154(b) by 1450 days.

(21) Appl. No.: 12/377,818

(22) PCT Filed: Aug. 17, 2007

(86) PCT No.: PCT/EP2007/007272
§ 371 (c)(1),
(2), (4) Date: Aug. 11, 2010

(87) PCT Pub. No.: WO2008/019865
PCT Pub. Date: Feb. 12, 2008

(65) Prior Publication Data
US 2010/0310746 A1 Dec. 9, 2010

(30) Foreign Application Priority Data
Aug. 17, 2006 (EP) .................................... 06017193

(51) Int. Cl.
*A23L 1/00* (2006.01)
*A23L 1/24* (2006.01)
(52) U.S. Cl.
CPC . *A23L 1/0097* (2013.01); *A23L 1/24* (2013.01)
USPC .......................................... 426/564; 426/572
(58) Field of Classification Search
USPC .......................................... 426/564, 572, 541
See application file for complete search history.

(56) References Cited

U.S. PATENT DOCUMENTS

| 6,368,652 B1 | 4/2002 | Heertje et al. ................. 426/601 |
| 2010/0055266 A1 | 3/2010 | Windhab et al. .............. 426/317 |

FOREIGN PATENT DOCUMENTS

| EP | 1 366 670 A1 | 12/2003 |
| EP | 1 366 670 B1 | 12/2003 |
| EP | 1 668 992 A1 | 6/2006 |

OTHER PUBLICATIONS

European Search Report EP06017193.1-2114 Dated Oct. 25, 2006.
Shrestha et al., XP005569358, "Aqueous Foam Stabilized by Dispersed Surfactant Solid and Lamellar Liquid Crystalline Phase" Journal of Colloid and Interface Science, vol. 301, pp. 274-281,(2006).
Dickinson et al., XP005606976, "Structure Formation in Casein-Based Gels, Foams, and Emulsions" Colloids and Surfaces. A, Physicochemical and Engineering Aspects, vol. 288, No. 1-3, pp. 3-11, (2006).
Anokhina M. S. et al., XP004719671, "Calorimetric Investigation of the Thermodynamic Basis of the Effect of Maltodextrins on the Foaming Ability of Legumin in the Presence of Small-Molecule Surfactant", Food Hydrocolloids, vol. 19, No. 3, pp. 455-466, (2005).
Murray B. S. et al., XP004668052, "Foam Stability: Proteins and Nanoparticles" Current Opinion in Colloid and Interface Science, vol. 9, No. 5, pp. 314-320 (2004).
Miller R. et al., "Tensiometry As a Tool for Quantitative Analysis of Surfactant Adsorption", SOFW Journal, vol. 130, pp. 2-10 (2004).
International Search Report PCT/EP2007/007272 Dated Jan. 22, 2008.
Chilean Patent Application No. CL-2086-2007, filed Jul. 17, 2007 (English in corresponding to U.S. Appl. No. 60/831,607 and U.S. 2010/055266 A1).

*Primary Examiner* — Jyoti Chawla
(74) *Attorney, Agent, or Firm* — Winston & Strawn LLP

(57) ABSTRACT

The present invention describes an aqueous foam that includes water, at least one polysaccharide and food-grade, interfacially active particles. The present invention also describes an indulgent shelf-stable foamed food product that contains this aqueous foam. The indulgent shelf-stable foamed food products of the invention have an improved foamed and modular product texture.

15 Claims, 6 Drawing Sheets

Lamellar surfactant crystal particles at the macroscopic air-water interface viewed by Brewster Angle Microscopy Gas permeability of thin air bubble films
(Diminishing bubble experiment)

Air bubbles stabilized by SSL crystals in yoghurt

100 μm

Arrows indicate polarization generated
by SSL crystals around air bubbles

AQUEOUS FOAMS, FOOD PRODUCTS AND A METHOD OF PRODUCING SAME

This application is a 371 filing of International Patent Application PCT/EP2007/007272 filed Aug. 17, 2007.

FIELD OF THE INVENTION

The invention relates to the incorporation of air or gas into food matrices which are viscous and difficult to foam. More particularly, it relates to aqueous foams and food products containing same having an improved and modular product texture. The invention further relates to a process of producing the foamed food products.

BACKGROUND OF THE INVENTION

Viscous products are known on the market since they give to the consumer a gratifying and stable product quality. However, such products are often graded by the consumer as being heavy. One way to improve the acceptance of these products by the consumer is by incorporating air or gas into such products since this gives more lightness and delight to the consumer during consumption of these viscous products.

However, technically, it is not a trivial task to incorporate air or gas into viscous food matrices. It is well known that above a certain viscosity, it is very difficult to incorporate air in a significant amount. Most of the air added to the product during the whipping or foaming step is not incorporated into the viscous product and lost (Blow-by). Moreover, the air is incorporated in form of large, polydisperse air bubbles into the viscous matrix. The bubble mean size, size distribution and bubble interface composition cannot be easily controlled, and the quality of the final produced product, i.e., stability over time and sensory attributes, cannot be assured.

Classically, in order to make and stabilize the foamed product, a stabilizer system consisting of an emulsifier system and a viscosifying agent has to be added to the aqueous bulk phase prior to the foaming step. The main drawback of this is, however, the limitation of making foams out of aqueous phases which are viscous due to the significant decrease of the diffusion rate of the emulsifier system from the viscous bulk phase to the bubble interface during the foaming process resulting in a unacceptable final product quality (broad gas bubble distribution and inhomogeneous distribution of the entrained gas) and low shelf stability. So far the control and design of the texture of foamed products is mainly achieved by adding a viscosifying agent to the food matrix prior to the foaming step, leading to a low product quality if the viscosity of the liquid bulk phase is too high.

In order to make stable foamed products, specific emulsifier/stabilizer systems have to be added prior to the foaming step. For instance, U.S. Pat No. 6,368,652 B1 describes food products including whippable products which are stabilized by a specific surfactant combination, i.e., mainly consisting of a non-ionic surfactant and a minor amount of an ionic co-surfactant. The non-ionic surfactant is selected from monoglycerides while the ionic co-surfactant may be alkali salts of lactylated fatty acids, citric acid esters, succinated esters and diacetyl tartaric acid ester of monoglycerides. The ionic co-surfactants are used to swell the monoglyceride based lamellar liquid mesophases, i.e., to solubilize a large quantity of water into the inter-planar water layers of the bilayers making this mixture suitable as a structuring agent of the aqueous phase, fat replacer or foam control agent.

EP 1 366 670 A1 describes a gas containing desert and a method for preparation thereof in which the gas bubbles are stabilized by partially coalesced fat. Aerated food products, in which the gas bubbles are stabilized by partially coalesced fat, are based on fat-containing recipes, since partially coalesced fats are known to stabilize gas/air bubbles and foamed products, such as ice or whipped creams. However, such fat-based aerated products show limited stability during shelf-life. The reason of this is related to the insufficient stabilization of the air bubble structure against Ostwald ripening, coalescence or creaming leading to an increase in the bubble size, bubble size distribution and change in interface composition.

It is object of the invention to provide a technology to incorporate air or gas into viscous food matrices enabling a better control and stabilization of the air/liquid interface during the aeration process.

It is another object of the invention to provide shelf-stable viscous and indulgent food products having a controllable air bubble structure, i.e., a stable air/liquid (bubble) interface and an improved shelf-life.

SUMMARY OF THE INVENTION

The invention encompasses in one aspect, an aqueous foam as defined herein in which air is incorporated in form of small, monodispersed air or gas bubbles giving an indulgent foam. The interface which stabilizes the air bubbles is unique, since it consists of surface active food particles, such as particles made out of seeds, spices, spores, grains, sugar etc, or of a particular emulsifier mixture leading to the formation of supra-molecular interfacially active aggregates or particles, such as lamellar surfactant particles or crystals, biopolymer aggregates, biopolymer-polysaccharide aggregates, biopolymer-surfactant aggregates, melanoidins, complex coacervates, nutrient crystals etc. The specific interface composition and structure is responsible for the exceptional stability of the incorporated gas bubbles in the indulgent foam product. The exceptional stability of the bubbles is related to the fact that the bubbles are stabilized by supra-molecular aggregates or particles which show interfacial activity. The mixture does not contain partially coalesced fat, and therefore, provides a superior stability of the final food product than products stabilized by partially coalesced fat.

The invention encompasses a foamed food product as disclosed herein. Preferably, the product comprises 0.1 to 50 percent by weight of an aqueous foam.

The invention encompasses in a second aspect a process of producing the stable air/gas bubbles in a continuous way using 'adapted' high shearing devices. Not all classical shearing/whipping devices can be taken. For this invention suitable shearing devices are devices which allow to let adsorb or attach the supra-molecular interfacially active aggregates or particles to the newly created air/gas bubbles during the incorporation of the gas/air. This requires shearing/whipping devices which allow to deliver a local shear rate ranging between 1200 and 2200 s$^{-1}$ and providing a suitable residence time of the matrix within the shearing device ranging between 35 s to 80 s, which allow the adsorption or attachment of the interfacially active particles or aggregates to the newly created air bubbles. The formation of the interfacially active particles or aggregates can occur already in the bulk phase, i.e., prior to the attachment to the gas bubbles, or only after adsorption of surface active material in its molecular form. In the latter case, the supra-molecular aggregates (particles) are directly formed at the gas bubble interface.

The invention encompasses in a third aspect a process of incorporating the air bubbles into a viscous matrix leading to the formation of the indulgent foam. The process is comprising (i) the continuous formation of air bubbles stabilized by the interfacially active supra-molecular aggregates in an aqueous and non fat low viscous food matrix and (ii) adding/mixing continuously a viscous, matrix to the pre-foamed aqueous air/gas bubbles dispersion (primary foam) giving the product the indulgence character.

The invention encompasses a process of producing a shelf-stable foamed food product. The air bubbles contained in the food product obtained are stabilized by the interfacially active particles. The bubble dispersion is mixed in-line with the viscous matrix without inducing the disruption of the bubbles present in the pre-foamed product (no bubble coalescence, i.e. no lost of the stable bubble interface properties created in the first step). The exceptional stability of the bubbles created in the first step is achieved due to the involvement of interfacially active particles at the bubble interface. The interfacially active particles are either created before foaming or during the foaming step.

The viscosity of the aqueous solution in the first step which allows the creation of a fine and stable primary foam, stabilized by interfacially active particles is not exceeding 2 Pa·s.

The supra-molecular food-grade interfacially active particles of this invention are selected from the group of seeds, spices, seasonings, spores, cloves, pepper, fennel, cumin, coriander, nutmeg, poppy grains, paprika, cinnamon, talcum, pollen of flowers, wheat germs, wheat bran, saffron, coconut, cacao, melanoidins, sugar crystals, milk proteins, ginger, curry, nutrient crystals or aggregates selected from the group of lamellar surfactant crystals, particles made out of protein aggregates, polysaccharide aggregates, particles made out of protein-surfactant aggregates, particles made out of protein-polyssacharide mixtures, particles made out of polysaccharide-polysaccharide mixtures, particles made out of polysaccharide-protein phase separating mixtures, or mixtures thereof. The interfacially active particles may be already surface active on their own or get their surface active properties after grinding of the particle material and/or by addition of a low molecular weight emulsifier which adsorbs to the interface of the particles. The interfacial activity of the particles of this invention (adsorption to the bubble interface or desorption from the bubble interface) can be followed using classical surface tensiometry, such as the Wilhelmy plate of Drop shape or Drop volume or Bubble pressure tensiometry (R. Miller et al., SÖFW-Journal 130, 2-10 (2004)). The adsorption/attachment of the interfacially active particles to the gas or air bubbles can be followed by light and/or electron microscopy. Especially polarized light or fluorescent microscopy is a suitable technique to visualize the attachment of interfacially active particles at the air-bubble surface (see FIG. 5)

The term 'Interfacially active particles' is used herein to describe colloidal particles, i.e., supra-molecular aggregates, having a diameter between 0.5 nm up to several tens of a micrometer, which act in many ways like emulsifiers in the sense that they are able to adsorb or attach to a fluid-air interface. The unique feature of the adsorbed particles is that their attachment at the air-water interface is irreversible. This is clearly not observed using commonly used foaming agents, such as low molecular surfactants, such as Tween 80, or polymers, such as whey proteins, which are adsorbed in a reversible way and desorb again after a certain time (an adsorption/desorption equilibrium between the bulk and the bubble interface is established). The irreversible attachment of the particles to the fluid-air interface of the gas bubbles gives the bubbles the remarkable stability against coalescence or Ostwald ripening.

According to the present invention, the interfacially active particles can be created in different ways: One way to create interfacially active particles is by using low molecular weight ionic emulsifiers, heating the aqueous dispersion above their Krafft temperature and cooling the dispersion down again to room temperature while stirring.

During the cooling step the particles are formed. The foaming of the aqueous phase can be during the cooling step or just after the system is cooled down to room temperature. The used emulsifier can be a mixture of different emulsifiers or can be used singly.

The shelf-stable indulgent foams are storable at temperatures above 0° C. including room temperature without loosing the gas present in form of tiny gas bubbles in the product. The indulgent foam of this invention has a new light texture and structure and provides the possibility to make indulgent and stable low- or no fat products as gas bubble containing products, in which the oil droplets are replaced by gas bubbles to give the indulgent character to the product.

The invention can also be used to make new environmentally friendly foamed products in the area of cosmetics, nutrition, medicine, agro-chemicals, chemicals, drugs, pharmaceutics.

BRIEF DESCRIPTION OF THE DRAWINGS

Further features and advantages of the invention can be ascertained from the following detailed description that is provided in connection with the drawing described below.

DETAILED DESCRIPTION OF THE PREFERRED EMBODIMENTS

Figure 1:
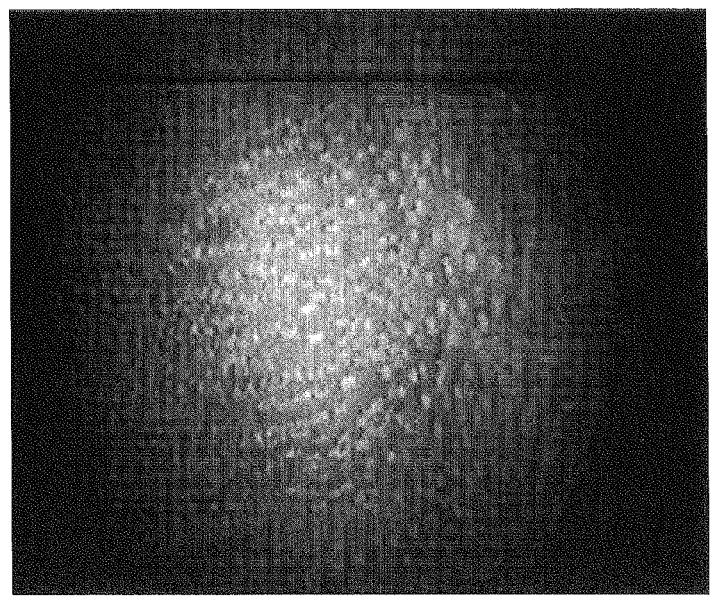
FIG. 1 shows lamellar surfactant crystal particles at the macroscopic air-water interface viewed by Brewster Angle Microscopy.

The aqueous foam of the present invention comprises air/gas bubbles stabilized by supra-molecular aggregates or particles which show interfacial activity. FIG. 1 shows lamellar surfactant crystal particles at the air-water interface viewed by Brewster Angle Microscopy. The crystal particles are formed of sodium steaoryl lactylate (SSL). Stabilization of the air bubbles occurs by adsorption or attachment of the crystal particles to the created air bubbles during incorporation of air.

Figure 2:
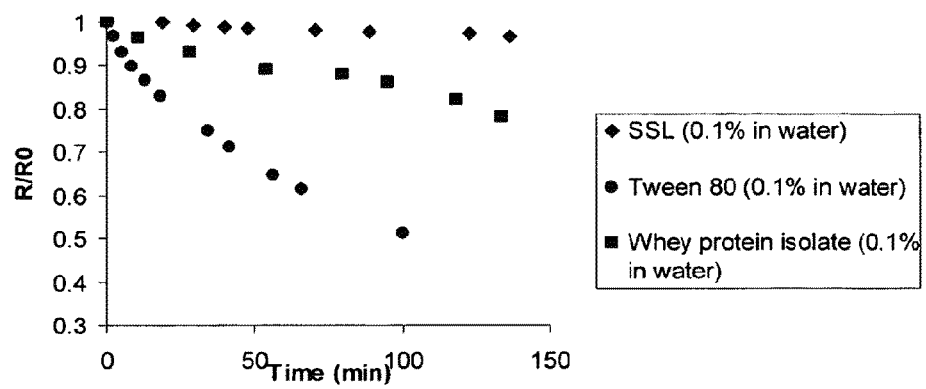
FIG. 2 shows diminishing bubble experiments illustrating the stability at room temperature of a single air bubble stabilized by surface active particles against Ostwald ripening.
Figure 5:
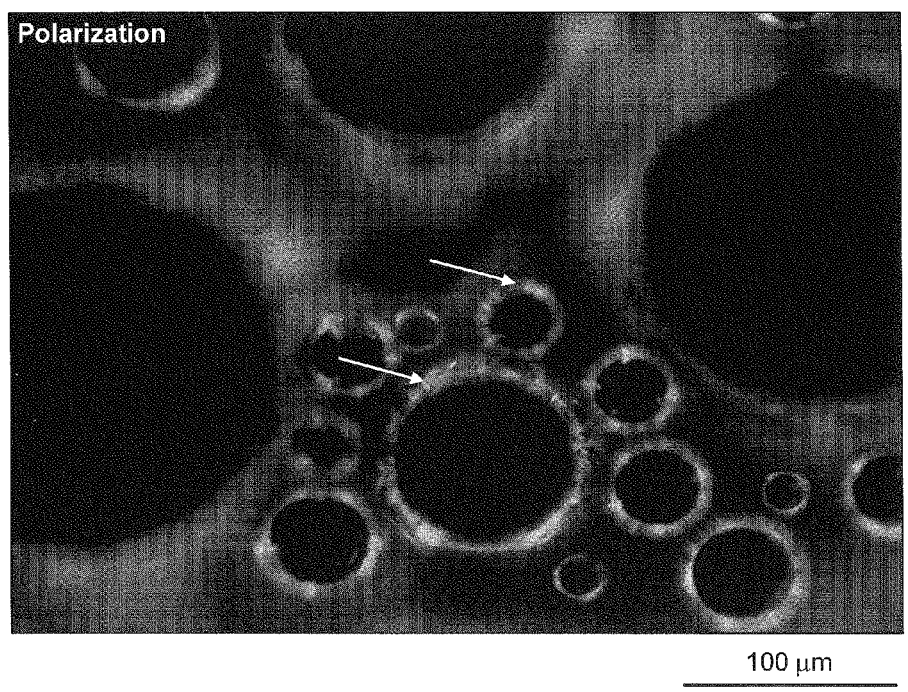
FIG. 5 shows a microscopic picture obtained using polarized light of a foam stabilized by SSL lamellar crystals, which are attached to the gas bubble interface. The arrows indicate the SSL particles at the air bubble interface.

The extreme stabilization of the bubbles formed in the aqueous foam have been confirmed in diminishing bubble experiments shown in FIG. 2. The diagram of FIG. 2 shows the stability of a single air bubble against Ostwald ripening at room temperature. The stability of the bubble is characterized by the decrease of the measured bubble $R^3$ normalized by the bubble radius $R_0^3$ at the beginning of the measurement. The bubble is stabilized by (i) SSL lamellar crystal particles and compared to the stability of a single bubble stabilized by (ii) Tween 80 (a soluble surfactant present in its molecular form at the bubble surface) or (iii) whey protein molecules. Note that the stability of the bubble stabilized by SSL particles is significantly higher than the stability of the bubbles stabilized by the commonly used surfactants, such as the low molecular weight surfactants such as Tween 80, or proteins, such as the whey proteins. The enormous stability of the bubble when stabilized by particles is due to the fact that the particles are irreversibly attached to the air bubble interface. The particles sitting at the air bubble interface can be easily visualised by means of polarized light microscopy (see FIG. 5) or fluorescence light microscopy A polysaccharide or hydrocolloid is advantageously present in the aqueous foam up to a certain concentration as it allows the foam to have a certain viscosity which helps to increase the stability of the primary foam.

In a preferred embodiment of the invention, the polysaccharide or hydrocolloid is present in an amount of 1 to 60 wt.-% based on the components of the aqueous foam. More preferably, the amount of the polysaccharide or hydrocolloid in the aqueous foam is in a range of 10 to 50 wt.-%, specifically in a range of 20 to 40 wt.-%.

Principally, every polysaccharide or hydrocolloid which is used to viscosify an aqueous solution, can be used in the aqueous phase, as long as it is water soluble and capable of imparting a certain, but not too high viscosity to the aqueous foam. The viscosity of the primary aqueous solution should not exceed 2 Pa·s, preferably ranging between 0.5 to 1 Pa·s. Preferably, the polysaccharide is selected from at least one of starch, cellulose gums and derivatives thereof. Specifically, the polysaccharide is a starch derivative or others hydrocolloids like carrageenan, guar, caroube, acacia gums, xanthan, alginates. In a particularly preferred embodiment of the invention, the starch derivative is maltodextrin.

In a preferred embodiment of the present invention, the food-grade, interfacially active particles are present in the primary aqueous phase in an amount of 0.5 to 10.0 wt.-% based on the components of the aqueous foam. More preferably, the amount of the food-grade, interfacially active particles is in a range of 1.0 to 5 wt.-% based on the components of the aqueous foam. More preferably, the amount of the food-grade, interfacially active particles is in a range of 1.0 to 3.0 wt.-% based on the components of the aqueous foam.

In a further preferred embodiment of the invention, the food-grade, interfacially active particles comprise at least one lamellar crystal forming surfactant selected from sodium stearoyl lactylate (SSL), calcium stearoyl lactylate (CSL), salts of fatty acids, lactic acid ester of monoglycerides (LACTEM), citric acid ester of monoglycerides (CITREM), succinated ester of monoglycerides (SMG), diacetyl tartaric acid ester of monoglycerides (DATEM), phospholipids, sucrose esters, polyglycerol esters, propylene glycol stearate, sorbitan monostearate (SMS), sorbitan tristearate (STS). In a particularly preferred embodiment of the present invention, the lamellar crystals forming surfactant is sodium stearoyl lactylate (SSL).

In a further preferred embodiment of the invention, the food-grade, interfacially active particles comprise at least one food-grade particulated material, i.e., a food-grade material which is present in form of particles which have a diameter not larger than several tens of a micrometer. If necessary, in order to get the desired particles diameter, the particulated material can be grinded or treated with any suitable technology to get the desired particle sizes. The particles may already be surface active on their own. If their surface activity is not yet high enough allowing the adsorption or attachment of the particles to the gas bubble surface or interface, an emulsifier can be added which adsorbs to the particle interface and makes the particle surface active. The food-grade, interfacially active particles are selected from the group of seeds, spices, seasonings, spores, cloves, pepper, fennel, cumin, coriander, nutmeg, poppy grains, paprika, cinnamon, talcum, pollen of flowers, wheat germs, wheat bran, saffron, coconut, cacao, melanoidins, sugar crystals, milk proteins, ginger, curry, cell wall extracts, nutrient crystals or mixtures thereof. The nutrient crystals are made of water-insoluble nutrients forming crystals in water. Examples are phytosterols, cholesterol, hesperidin, lycopene, carotenoids, flavonoids, antioxidants or other crystal forming nutrients.

According to the present invention, the interfacially active particles can be created by forming soluble surfactant-protein, protein-protein or protein-polysaccharide complexes.

The stabilized aqueous foams can be aerated in any device suitable to create high overruns. Examples of such devices are a colloidal mill or rotor-stator type devices which allow to deliver a local shear rate ranging between 1200 and 2200 $s^{-1}$ and providing a suitable residence time of the matrix within the whipping device ranging between 35 s to 80 s. Moreover, membrane-based foaming devices can also be used. Such foaming devices allow formation of very fine and extremely stable aqueous foams stabilized by surface active particles.

The aqueous foam of the present invention is aerated to have an overrun of up to 500%, preferably in a range of 200 to 450%.

In principle, any food product may be foamed by the above-described aqueous foam. Examples of food products to be foamed are ice cream mixes, sorbet mixes, dessert mousse mixes, dairy products, fermented dairy products, soups, sauces, mayonnaise and beverages, dressings, liquid dairy products, creams, imitation creams, concentrated milks, condensed milk, non-dairy creams, toppings, chilled dairy, confectionery filling, candies, dough, batter.

The present invention also provides a shelf-stable indulgent, foamed food product having a light and pleasant foam texture. The air bubbles structure is stable at temperatures above 0° C., even at room temperature, due to the very fine and extremely stable air bubble distribution in the food product. The interface which stabilizes the air bubbles is unique, since it consists of a particular particulated material or emulsifier mixture leading to the formation of supra-molecular interfacially active aggregates or particles, such as food particles made out of seeds, spices, spores, grains, sugar crystals etc, surfactant particles or crystals, biopolymer aggregates, biopolymer-polysaccharide aggregates, biopolymer-surfactant aggregates, melanoidins, complex coacervates. The surfactant particles or crystals can be selected from sodium stearoyl lactylate (SSL), calcium stearoyl lactylate (CSL), salts of fatty acids, lactic acid ester of monoglycerides (LACTEM), citric acid ester of monoglycerides (CITREM), succinated ester of monoglycerides (SMG), diacetyl tartaric acid ester of monoglycerides (DATEM), phospholipids, sucrose esters, polyglycerol esters, propylene glycol stearate, sorbitan monostearate (SMS), sorbitan tristearate (STS) or mixture thereof.

The shelf-stable foamed food product according to the invention comprises 0.1 to 50 percent by weight of an aqueous foam (based on the finished food product).

Figure 3:
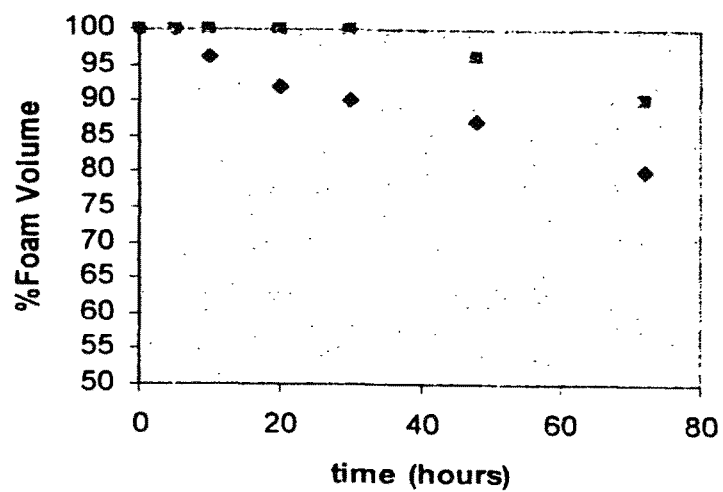
FIG. 3 illustrates the foam stability of an indulgent foamed product according to the invention versus a conventionally foamed product.

FIG. 3 illustrates the foam stability of an indulgent foamed product according to the invention versus a conventionally foamed product. The storage temperature is 40° C. and the air bubbles are stabilized by surfactant particles made from a 1.5% SSL (sodium steaoryl lactylate) dispersion. As can be seen from the percent foam volume of the foamed products, the foamed product according to the invention remains stable over a time period measured while the conventionally foamed product fails to retain in foam volume already shortly after preparation.

A food product of the present invention comprises the aqueous foam as described above to provide shelf-stable indulgent foam products. The overrun in the final indulgent product is in a range of 10 to 300%. In a particularly preferred embodiment, the overrun of the final shelf stable product is ranging between 25 to 150%.

Further, the shelf-stable indulgent foam food products of the present invention are storable at temperatures above 0° C., even at room temperature without loosing their foamed structure. As the aqueous foam is stable by itself, it can be also used as an intermediate product which is then, as desired, used for further processing. Due to the absence of fat in the aqueous foam, it can be used in virtually all food products.

The shelf-stable foamed food products of the present invention have a light and pleasant texture. The texture perceived by the consumer is related to the amount of gas bubbles present in the indulgent foam. This can easily be modulated by varying the overrun in the primary aqueous foam and/or by varying the mixing ratio of the primary aqueous foam and viscous food matrix. It is possible to provide the shelf-stable foamed food products as stable low-fat products which are highly appreciated by the consumers as the aqueous foam contained in the shelf-stable foamed food products does not comprise fat components. In addition, due to the presence of a polysaccharide having a weak sweet taste, the aqueous foam can be easily used in food products in which an intense sweetness is not desired, such as in soups, mayonnaise and beverages.

A process for producing a shelf-stable foamed food product as described above may comprise a two-step foaming process. In a first step a primary aqueous foam comprising water, at least one polysaccharide or hydrocolloid and interfacially active supra-molecular particles is formed, and, in a second step, said aqueous foam is added to a food product to be foamed.

In a preferred embodiment of the process of the present invention, the aqueous foam is formed by heating a mixture containing water, at least one polysaccharide or hydrocolloid and the ingredient being able to form interfacially active particles to a temperature in a range of 60 to 100° C., cooling down the mixture to a temperature in a range of 0 to 30° C. and aerating the mixture.

The aqueous foam may be prepared separately and subsequently added to the food product. In another preferred embodiment of the process of the present invention, the aqueous foam may be formed in situ in the presence of the food product, i.e. the aqueous foam is directly prepared in the food product to be foamed.

In a particularly preferred embodiment of the process of the present invention, the aqueous primary foam and the food product to be foamed are mixed continuously to provide the shelf-stable final indulgent foamed food product.

The polysaccharide or hydrocolloid used in the formation of the aqueous foam is used in an amount of 1 to 60 wt.-% based on the components of the aqueous foam. Preferably, the amount of polysaccharide is in a range of 10 to 50 wt.-%. More preferred, the amount of polysaccharide is in a range of 20 to 40 wt.-%.

In principle, any polysaccharide may be used in the formation of the aqueous foam provided that it is water soluble and little sweet. In a preferred embodiment of the process of the present invention, the polysaccharide is selected from at least one of starch, cellulose and derivatives thereof. In a particular embodiment of the invention the polysaccharide is a starch derivative. Most preferred, the starch derivative is maltodextrin.

Further, hydrocolloids may be used such as carrageenan, guar, caroube acacia gums, xanthan and alginates.

In the process of the present invention the ingredient capable of forming interfacially active particles are preferably used in a range of 0.5 to 10.0 wt.-% based on the components of the primary aqueous foam. More preferably, the amount is in a range of 1.0 to 5.0 wt.-%, 1.0 to 3.0 being most preferred.

The ingredient capable of forming interfacially active particles corresponds to those as described above.

In a preferred embodiment of the process of the present invention, the ingredient capable of forming interfacially active particles is a lamellar phase forming surfactant selected from sodium stearoyl lactylate (SSL), calcium stearoyl lactylate (CSL), salts of fatty acids, lactic acid ester of monoglycerides (LACTEM), citric acid ester of monoglycerides (CITREM), succinated ester of monoglycerides (SMG), diacetyl tartaric acid ester of monoglycerides (DATEM), phospholipids, sucrose esters, polyglycerol esters, propylene glycol stearate, sorbitan monostearate (SMS), sorbitan tristearate. More preferably, the at least one lamellar phase forming surfactant is sodium stearoyl lactlyate (SSL).

The primary aqueous foam can be aerated to high overruns. In a preferred embodiment of the process of the present invention, the aqueous foam is aerated to an overrun of up to 500%. Preferably, the aqueous foam is aerated to an overrun in a range of 200 to 450%, more preferred 50 to 300%. The overrun in the final aerated indulgent product is ranging between 10 to 300%, more preferably between 25 to 150%.

In principle any food product may be foamed by the process of the present invention. Due to the absence of fat, virtually all food products can be foamed. The use of a polysaccharide having a low sweetness allows foaming of non-sweet food products. In a preferred embodiment of the process of the present invention, the aqueous foam can be combined with a food product selected from ice cream mixes, sorbet mixes, dessert mousses, dairy products, fermented dairy products, soups, sauces, mayonnaise and beverages, dressings, liquid dairy products, creams, imitation creams, concentrated milks, condensed milk, non-dairy creams, toppings, chilled dairy, confectionery fillings, candies, dough, batter.

There is no particular limitation as to the mix ratios of the aqueous foam and the food product. As an example, the aqueous foam is mixed with the food product in a proportion of 1:3 in a regular continuous mixing device. However, other mixing ratios are appropriate depending on the food product to be foamed.

In the final product, 0.1 to 50 percent by weight (based on the finished food product) comes from the pre-formed aqueous bubble dispersion.

It has been shown that the foamed food products produced according to the process of the present invention are stable for a long time, even at room temperature. Reference is made to FIG. 3 showing a comparison between a foamed food product stabilized with 0.5% SSL according to the present invention and a foamed food product aerated using a conventional process. As can be seen from FIG. 3, the foamed food product produced according to the present invention is stable over a time period of more than 24 hrs at 40° C. In contrast thereto, the foamed product produced using a conventional process is less stable since 10% of the foam volume is lost after 24 hours at 40° C.

The foaming procedure according to the process of the present invention enables the production of shelf-stable food product foams. The produced foamed products are storable at temperatures above 0° C., even room temperature without loosing the gas present in the form of tiny gas bubbles in the product. It has been shown that the two-step foaming procedure of the process of the present invention results in improved aerated viscous bulk phases. The aqueous foams stabilized with the at least one lamellar phase forming surfactant such as SSL can be made with high overruns of up to 500%.

Figure 4A:
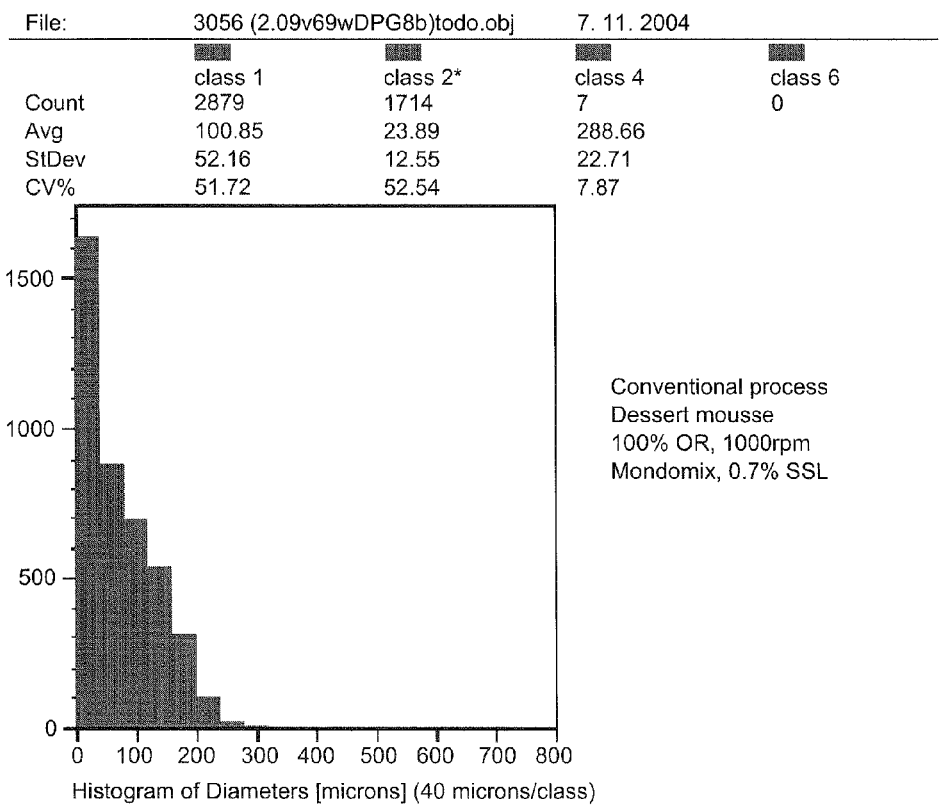
FIGS. 4a and 4b show a comparison of the bubble size distribution in a dessert mousse produced using a conventional foaming process (FIG. 4a) and the 2 step process using SSL lamellar crystals as bubble stabilizer (FIG. 4b).
Figure 4B:
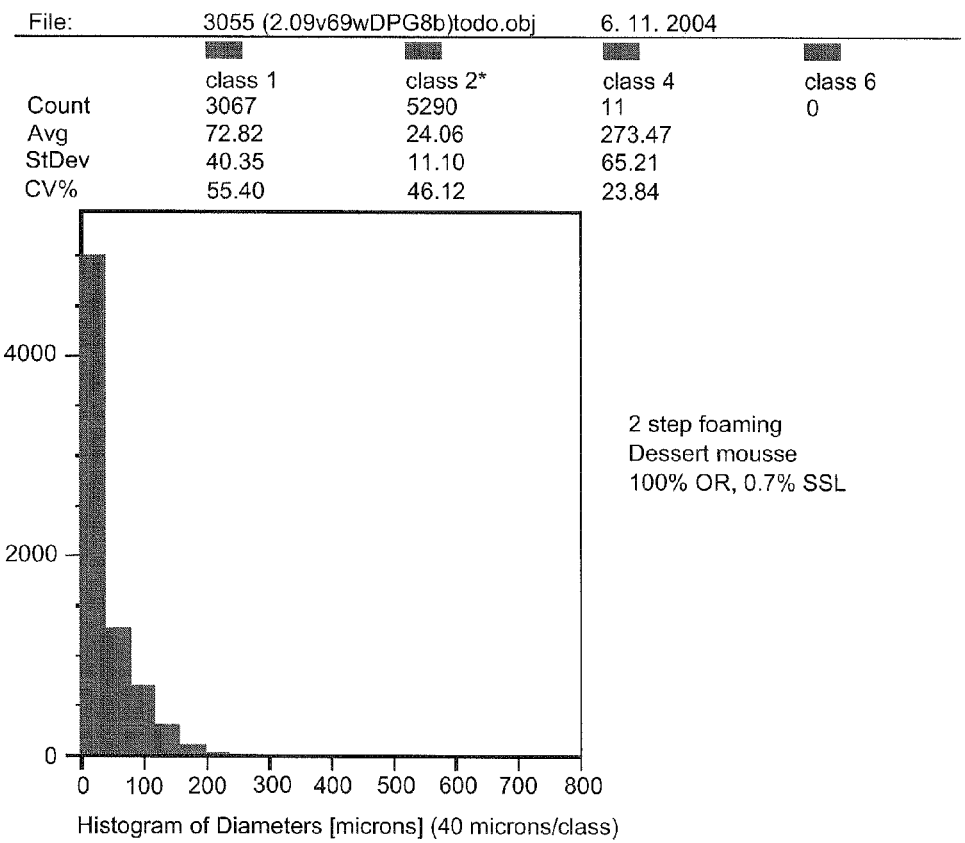

A further advantage of the process of the present invention is that the bubbles which are created in the first step, i.e. the step of forming the aqueous foam, can be mixed in-line with the viscous food product without coalescing, i.e. without loosing their stable interface properties created in the first step. As depicted in FIGS. 4a and 4b, the bubble size distribution obtained with the described process (FIG. 4a) is generally narrower than the microstructure obtained with a conventional whipping process (FIG. 4b). This difference leads to different textures and different sensorial attributes in the final foamed product.

The shelf-stable foamed product produced according to the process of the present invention have an improved and modular product texture by controlling the gas bubbles size distribution and overrun. This provides a more stable foaming process. The foamed food products produced can be stored e.g. at 4° C. or even at room temperature. The foamed food product produced are excellent light and low-fat stable products as the gas bubbles take the place of oil droplets.

EXAMPLE 1

Mousse Dessert

The operation is carried out as indicated above using the following recipe to obtain a final indulgent aerated product with an overrun of 100% and having a dry matter content of the order of 34%. The aqueous phase is whipped up to 400% overrun and then continuously mixed and diluted four times with the dairy recipe. A final product is obtained which is very well preserved for 6 weeks at +4° C. and which remains quite firm without any separation. The bubbles remain homogeneously dispersed. The final product can also be stored at subzero temperatures, i.e., down to −30 to −50° C., in its frozen state, and thawed back to room temperature without loosing its original foam structure. A narrower bubble size distribution and firmer texture is obtained compared to a conventional whipping process where all the ingredient are mixed together.

| Ingredients | Aqueous phase | Dairy recipe |
| --- | --- | --- |
| Whole milk | — | 60.50% |
| Cream (35%) | — | 18.20% |
| Sugar | — | 11.60% |
| Skimmed milk powder | — | 6.60% |
| Gelatin | — | 2.50% |
| Emulsifier SSL (Danisco) | 2.00% | — |
| Maltodextrin DE21 | 50.00% | — |
| amidon | — | 0.60% |
| Water | 48.00% | — |

EXAMPLE 2

Coffee Mousse

The procedure is carried out as above, the only difference is the composition of the aqueous phase and of the dairy recipe. The final coffee foam can be stored at least for one month at 4° C. without any separation. The aqueous foam is whipped up to 300% overrun and then diluted three times by continuous mixing with the dairy recipe. A narrower bubble size distribution is observed in the product obtained by using the above process.

| Ingredients | Aqueous phase | Dairy recipe |
| --- | --- | --- |
| Whole milk | — | 60.50% |
| Cream (35%) | — | 18.20% |
| Sugar | — | 11.60% |
| Skimmed milk powder | — | 6.60% |
| Gelatin | — | 2.50% |
| Emulsifier Datem (Danisco) | 2.00% | — |
| Maltodextrin DE21 | 40.00% | — |
| Coffee Extract | — | 1% |
| Water | 58.00% | — |

EXAMPLE 3

Filling for Confectionery

The product is obtained as the preceding examples. The aqueous phase is aerated up to 300% overrun and then diluted 3 times with the Chocolate base. The final foamed product can be used as a filling cream for confectionery products and can be kept at room temperature for several weeks.

| Ingredients | Aqueous phase | Chocolate Base |
| --- | --- | --- |
| Cocoa powder | — | 15.00% |
| Fat mix | — | 20.00% |
| Cocoa butter | — | 10.00% |
| Skimmed milk powder | — | 10.00% |
| Glucose syrup | 40.00% | 15.00% |
| Emulsifier SSL (Danisco) | 1.50% | — |
| Sugar | 15.00% | — |
| Sorbitol powder | 20.00% | 10.00% |
| Water | 23.00% | 20.00% |
| Potassium sorbate | 0.02% | 0.01% |

The invention claimed is:
1. A shelf-stable foamed food product comprising 0.1 to 50 percent by weight of an aqueous foam, the aqueous foam comprising gas bubbles that are stabilized by supra-molecular aggregates or particles which show interfacial activity, including at least one polysaccharide or hydrocolloid in an amount of 1 to 60 percent by weight of the aqueous foam and by food-grade, interfacially active particles in an amount of 0.5 to 10 percent by weight of the aqueous foam, wherein the interfacially active particles are seeds, spores, cloves, pepper, fennel, cumin, coriander, nutmeg, poppy grains, paprika, cinnamon, pollen of flowers, wheat germs, wheat bran, saffron, coconut, cacao, melanoidins, ginger, curry, crystals of phytosterols, cholesterol, hesperidin, lycopene, carotenoids, flavonoids, or lamellar surfactants, or mixtures thereof.
2. The food product of claim 1, wherein the interfacially active particles are seeds, spores, cloves, pepper, fennel, cumin, coriander, nutmeg, poppy grains, paprika, cinnamon, talcum, pollen of flowers, wheat germs, wheat bran, saffron, coconut, cacao, melanoidins, ginger, curry, phytosterol crystals, cholesterol crystals, hesperidin crystals, lycopene crystals, carotenoid crystals, flavonoid crystals, or mixtures thereof.

3. The food product of claim 1, wherein the interfacially active particles are lamellar surfactant crystals selected from the group consisting of sodium stearoyl lactylate (SSL), calcium stearoyl lactylate (CSL), salts of fatty acids, lactic acid ester of monoglycerides (LACTEM), succinated ester of monoglycerides (SMG), diacetyl tartaric acid ester of monoglycerides (DATEM), phospholipids, sucrose esters, polyglycerol esters, propylene glycol stearate, sorbitan monostearate (SMS), sorbitan tristearate (STS) and mixtures thereof.

4. The food product of claim 1, in the form of an ice cream mix, sorbet mix, dessert mousse mix, dairy product, fermented dairy product, liquid dairy product, soup, sauce, mayonnaise, beverage, dressing, cream, imitation cream, concentrated milk, condensed milk, non-dairy cream, topping, chilled dairy product, confectionery filling, candy, dough, or batter.

5. The food product of claim 1, having an overrun in the range of 10 to 300% with the at least one polysaccharide or hydrocolloid present in an amount of 10 to 50 percent by weight of the aqueous foam and is a starch or cellulose gum selected from at least one of maltodextrin, carrageenan, guar, caroube, acacia, xanthan, or alginate, and with the interfacially active particles in an amount of 1 to 5 percent by weight of the aqueous foam.

6. The food product of claim 5, wherein the overrun is in the range of 25 to 150% with the at least one polysaccharide or hydrocolloid present in an amount of 20 to 40 percent by weight of the aqueous foam and is a starch or cellulose gum selected from at least one of maltodextrin, carrageenan, guar, caroube, acacia, xanthan, or alginate, and with the interfacially active particles in an amount of 1 to 3 percent by weight of the aqueous foam.

7. The food product of claim 1, which does not contain a fat or fat component and which is storable at temperatures above 0° C. to room temperature without loosing gas from gas bubbles in the aqueous foam.

8. A process of producing the shelf-stable foamed food product of claim 1, which comprises the steps of:
    forming the aqueous foam by heating to a temperature in a range of 60 to 100° C. a mixture containing water, the amount of the at least one polysaccharide or hydrocolloid and an ingredient which is or is able to provide the interfacially active particles, cooling down the mixture to a temperature in a range of 0 to 30° C. and aerating the mixture; and
    adding 0.1 to 50 percent by weight of the aqueous foam to a food product.

9. The process according to claim 8, wherein the aqueous foam and the food product are mixed continuously.

10. The process according to claim 8, wherein the ingredient being able to form interfacially active particles is sodium stearoyl lactylate (SSL).

11. The process according to claim 8, wherein the food product is an ice cream mix, sorbet mix, dessert mousse mix, dairy product, fermented dairy product, liquid dairy product, soup, sauce, mayonnaise, beverage, dressing, cream, imitation cream, concentrated milk, condensed milk, non-dairy cream, topping, chilled dairy product, confectionery filling, candy, dough, or batter.

12. The process according to claim 8, wherein the aqueous foam is prepared in situ in the food product.

13. The process according to claim 8, wherein the aqueous foam is prepared separately and subsequently added to the food product.

14. The process according to claim 13, wherein the aqueous foam is aerated to an overrun of up to 500%.

15. The process according to claim 13, wherein the aqueous foam is aerated to an overrun in the range of 200 to 450%.

\* \* \* \* \*

UNITED STATES PATENT AND TRADEMARK OFFICE
CERTIFICATE OF CORRECTION

| | | |
|---|---|---|
| PATENT NO. | : 8,778,438 B2 | Page 1 of 1 |
| APPLICATION NO. | : 12/377818 | |
| DATED | : July 15, 2014 | |
| INVENTOR(S) | : Leser et al. | |

It is certified that error appears in the above-identified patent and that said Letters Patent is hereby corrected as shown below:

On the Title Page:
Item [87], change the PCT Pub. Date from "Feb. 12, 2008" to -- Feb. 21, 2008 --.

Signed and Sealed this
Fourteenth Day of October, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,778,438 B2
APPLICATION NO. : 12/377818
DATED : July 15, 2014
INVENTOR(S) : Leser et al.

It is certified that error appears in the above-identified patent and that said Letters Patent is hereby corrected as shown below:

On the Title Page
Item (75), Delete the name of the first inventor from "Martins Leser" and insert -- Martin Leser --.

Signed and Sealed this
Twenty-fourth Day of March, 2015

Michelle K. Lee
*Director of the United States Patent and Trademark Office*